(12) United States Patent
Germain

(10) Patent No.: US 6,830,249 B2
(45) Date of Patent: Dec. 14, 2004

(54) BRAZEABLE, MULTI-LEAD, LOW PROFILE SEALING FITTING AND METHOD OF INSTALLATION

(75) Inventor: Barry W. Germain, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 101 days.

(21) Appl. No.: 10/126,880

(22) Filed: Apr. 22, 2002

(65) Prior Publication Data

US 2003/0197335 A1 Oct. 23, 2003

(51) Int. Cl.⁷ ................................................. F16L 5/02
(52) U.S. Cl. ..................... 277/607; 277/616; 174/77 R; 174/65 SS; 174/97
(58) Field of Search ................................ 277/607, 616; 174/65 SS, 97, 115, 118, 116, 77 R, 154, 155–7, 158 R, 159, 160, 161 R, 163 R, 164, 165, 166 R

(56) References Cited

U.S. PATENT DOCUMENTS

| | | | | |
|---|---|---|---|---|
| 3,904,815 A | * | 9/1975 | Bamberger et al. | 174/151 |
| 4,003,620 A | * | 1/1977 | O'Brien et al. | 439/204 |
| 4,012,282 A | * | 3/1977 | Hutter et al. | 376/203 |
| 4,267,401 A | * | 5/1981 | Wilkinson | 174/77 R |
| 4,693,538 A | * | 9/1987 | Matsuo | 439/460 |
| 4,942,764 A | * | 7/1990 | Dews et al. | 73/301 |
| 5,235,134 A | * | 8/1993 | Jaycox | 174/87 |
| 5,235,138 A | * | 8/1993 | Shah et al. | 174/151 |
| 5,450,765 A | * | 9/1995 | Stover | 73/866.5 |
| 5,510,577 A | * | 4/1996 | Corrigan | 174/74 R |
| 5,692,918 A | * | 12/1997 | Hill | 439/323 |
| 5,920,035 A | * | 7/1999 | Haney et al. | 174/65 SS |
| 6,150,608 A | * | 11/2000 | Wambeke et al. | 174/65 G |

* cited by examiner

Primary Examiner—Alison K. Pickard
(74) Attorney, Agent, or Firm—Nixon & Vanderhye PC

(57) ABSTRACT

A seal fitting for use in high pressure equipment for allowing instrumentation wires to exit from the interior to the exterior of the equipment includes a main body which is welded to an opening in the equipment. A seat member is positioned within the main body such that two wires are passed through each of the slots in the seat member. The seat member is fixed to the main body by a pin that passes through the main body and into a portion of the seat member. A follower member, keyed to the seat member so that slots in the follower member align with the corresponding slots in the seat member, is then placed within the main body. The follower member is fixed to the seat member by a screw that passes through a central hole in the follower member and into a central portion of the seat member. Brazing alloy is then applied around the cap screw, on top of the follower member and around the wires exiting through the slots in the follower member.

10 Claims, 5 Drawing Sheets

BRAZEABLE, MULTI-LEAD, LOW PROFILE SEALING FITTING AND METHOD OF INSTALLATION

BACKGROUND OF THE INVENTION

The invention relates to a seal fitting and its method of installation within high pressure and temperature environments such as steam turbines and the like.

Instrumentation internal to steam cooled nozzles (pressure vessels) require an exit sealing fitting capable of sustaining high pressure. In such applications, a large number of instrumentation leads must be able to exit from the interior to the exterior of the pressure vessel through the fitting yet the fitting must be small enough as to not cause interference problems when installing the fittings to the pressure vessel.

Prior art seal fittings have utilized a commercially available "Lava" (Natural Magnesium Silicate) sealant. The Lava seal is a compressed powder composition, which is compacted internal to the fitting at assembly to form a seal around the leads within the interior of the fitting body.

The Lava seal, however, does not always seal the leads adequately, often allowing fluid leakage through the fitting to the exterior of the pressure vessel. Moreover, the lava seal fitting allows for only one lead per slot in the fitting thereby necessitating the use of multiple fittings. If more than one lead per slot is used with conventional lava fittings then the leakage problems are exacerbated, as the compressed powder composition cannot be tightly fitted against and around multiple leads within a single slot. The overall fitting size has also proven to be too large, and frequently has to be modified at the assembly stage to prevent interference.

The major components of assembled Lava seal 50, are shown in FIGS. 1–3, to include housings 53 and 54, driver 60, seat 61 and sealant 62. As generally shown in FIG. 3, driver 60, seat 61 and sealant 62 have a slotted profile when being viewed from one end, and for the reasons given above only one lead can be positioned in each slot 63 of these components. During assembly, driver 60 is used to compress the powder composition placed within housings 53 and 54 and between driver 60 and sealant 62, into close proximity and sealing contact around each lead disposed in each of the slots 63 of sealant 62.

FIG. 4 shows an installed Lava seal 50 in which the housing had to be modified by cutting side surface 64 so that it could be installed in tight conditions.

SUMMARY OF THE INVENTION

The present invention overcomes the problems associated with prior art seal fittings.

The present invention employs a low profile fitting body that is approximately ½ the height of prior art fittings, thereby eliminating most interference issues. The seal fitting of the present invention includes internal pieces which allow for more than one lead per slot, at least doubling the amount of instrumentation exiting the pressure vessel for each fitting.

Finally, the brazed fitting provides excellent sealing between leads in each slot, and from the slots to the fitting body inner diameter wall. The present invention also provides adequate assembly clearance between internal parts and the fitting body.

In summary, the present invention provides the structural soundness to meet pressure limits, and provides exit for at least twice as many sensor leads as was previously possible, yet in an overall smaller size profile fitting.

DETAILED DESCRIPTION OF THE INVENTION

An exemplary method of assembling the fitting will now be provided together with a detailed description of the major components forming an exemplary embodiment of the fitting.

Figure 3:
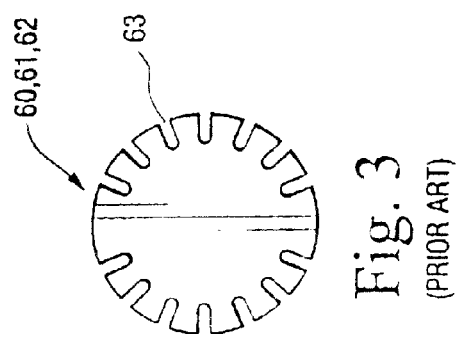
FIG. 3 generally shows the top surface of certain components of the Lava seal shown in FIG. 2.
Figure 1:
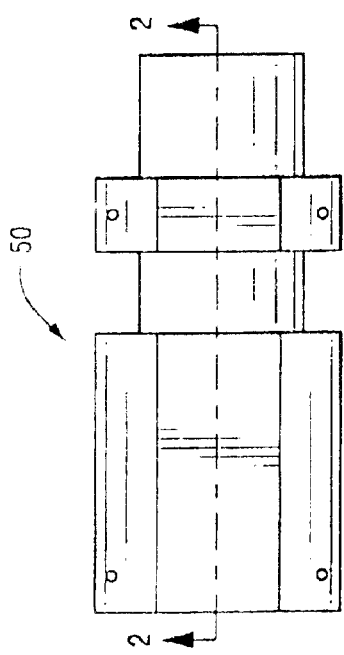
FIG. 1 shows an assembled prior art Lava seal.
Figure 2:
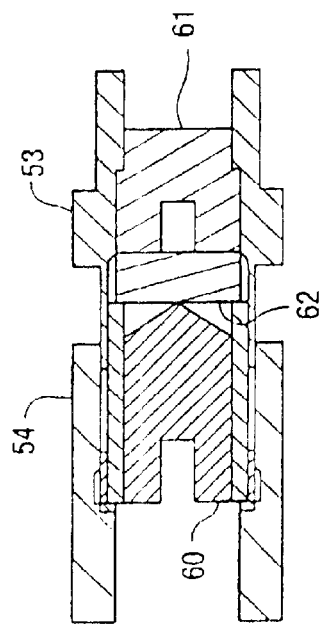
FIG. 2 is a cross sectional view of the Lava seal of FIG. 1 along lines II—II.
Figure 4:
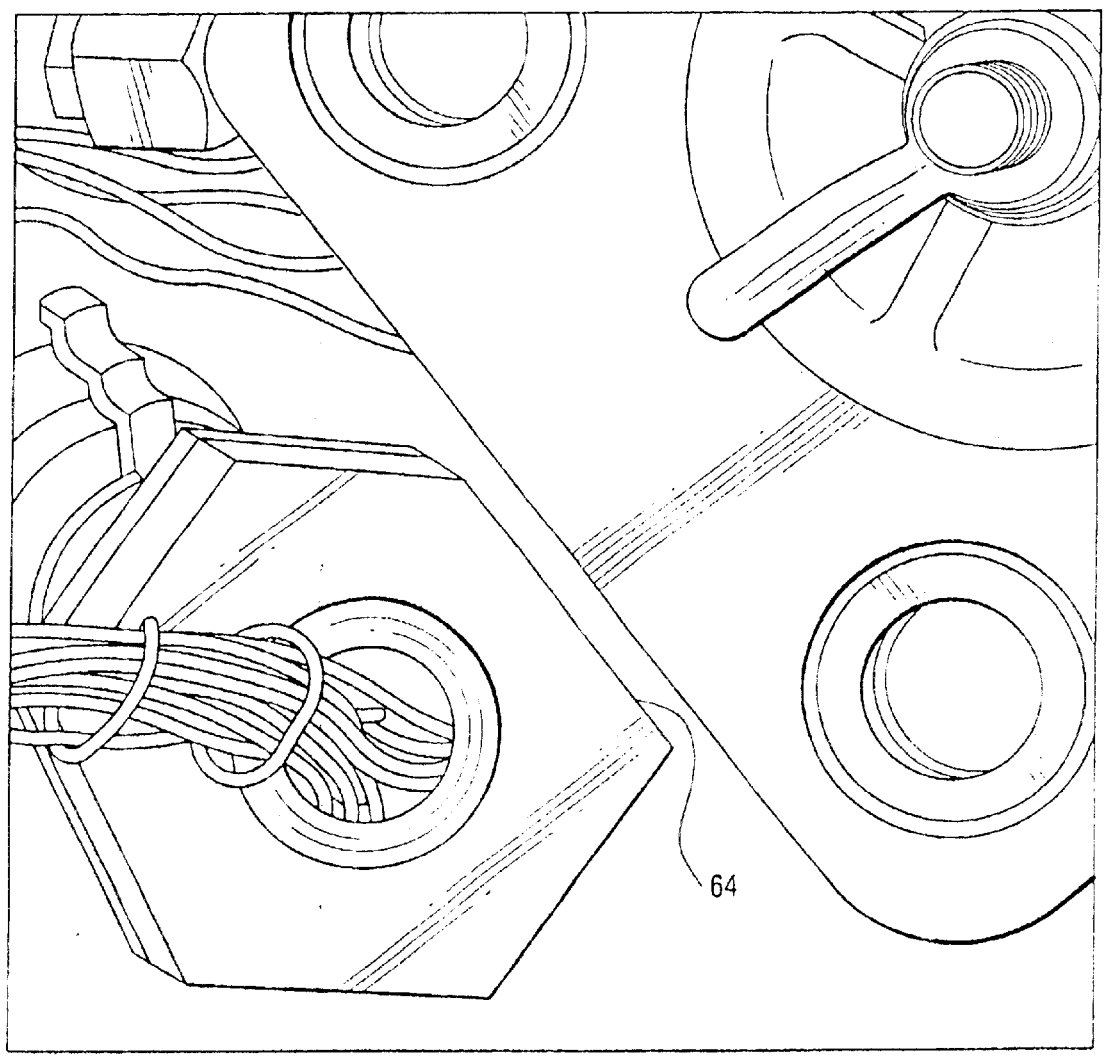
FIG. 4 shows an installed Lava seal in which the housing has been modified to accommodate its installation.
Figure 5:
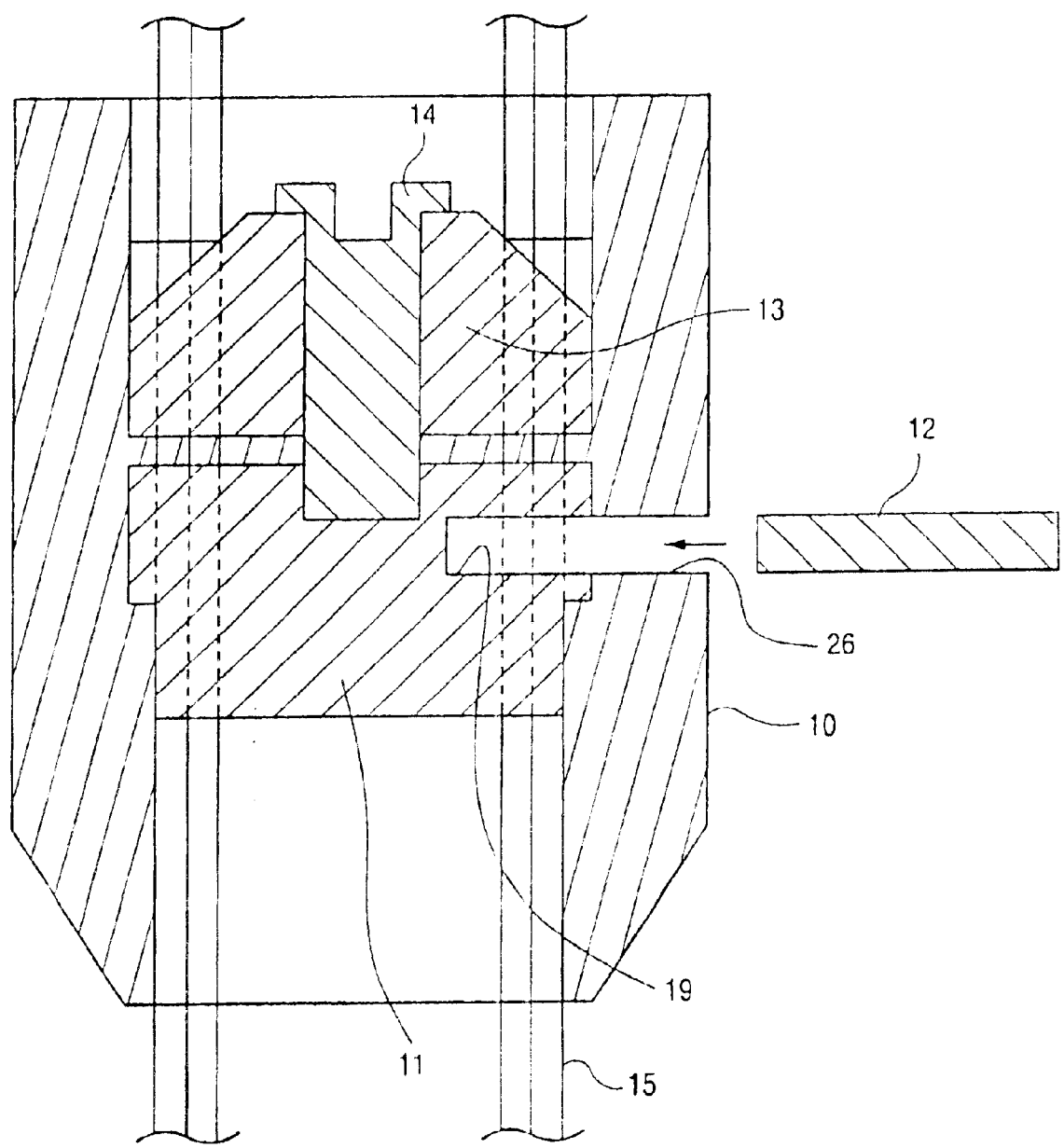
FIG. 5 shows a cross sectional view of an exemplary embodiment of the seal fitting of the present invention.
Figure 6:
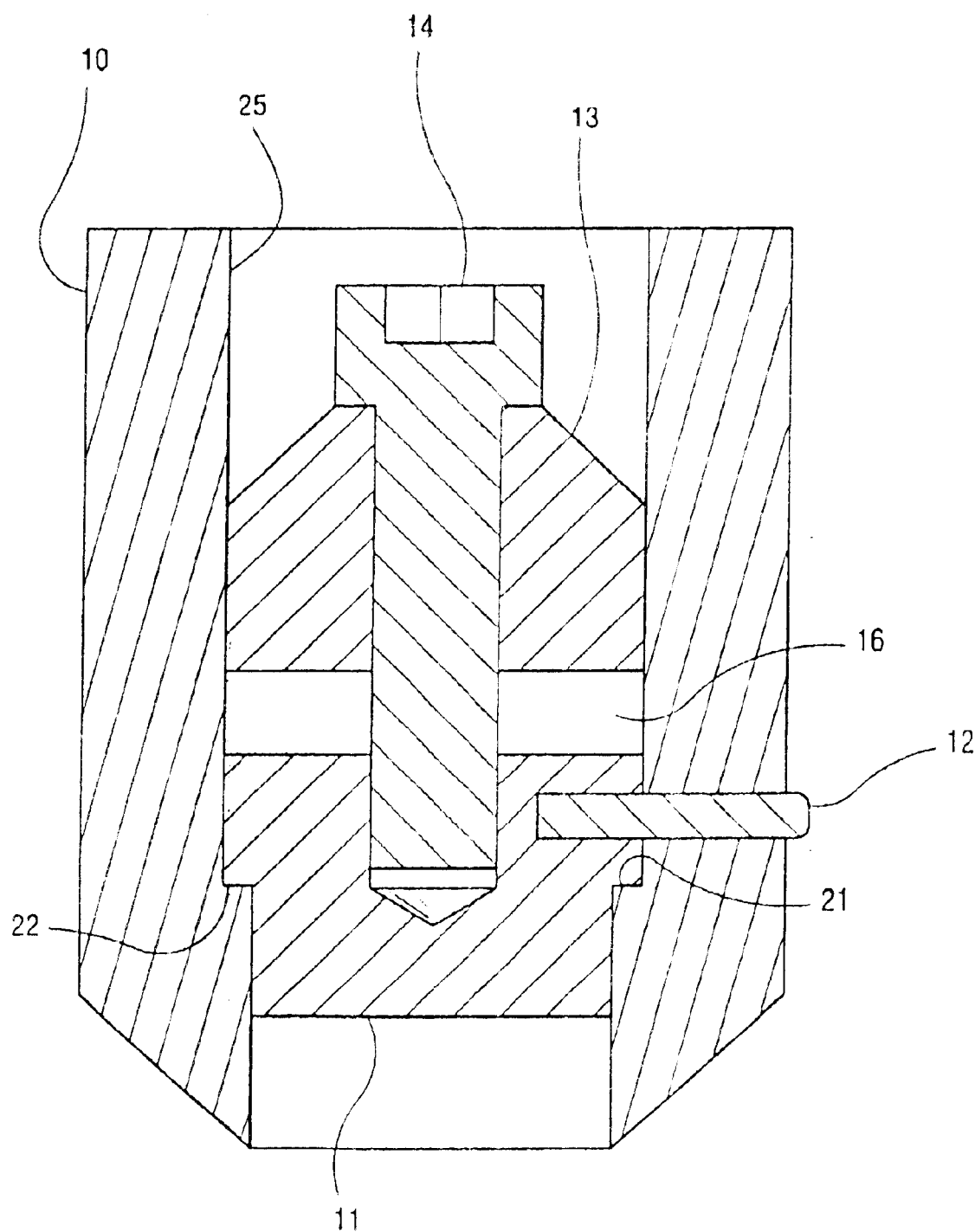
FIG. 6 shows a cross sectional view-of seal fitting of FIG. 5 in greater detail.

As shown in FIGS. 5 to 8, an exemplary embodiment of the seal fitting of the present invention comprises, inter alia; main body 10; seat 11; seat pin 12; follower 13; and cap screw 14. FIG. 5 shows leads 15, such as instrumentation wires, traversing through the seal fitting from the interior of a pressure vessel at the bottom of the drawing to the exterior of the pressure vessel at the top of the drawing. As shown in FIG. 6, the preferred exemplary embodiment also includes an insulating material layer 16.

During assembly of the exemplary embodiment of the fitting, cylindrical main body 10 is welded to the nozzle or pressure vessel, and is dimensioned and re-machined, if necessary, to its true shape in the case of weld distortion. The leads 15 (i.e., instrumentation wires) are then routed through central bore 25 of the fitting body 10. Central bore 25 is formed of two different diameters, so as to form a shoulder projection 22 along its inner surface. Main body 10 also has an opening 26 from its outer surface and communicating with central bore 25.

Cylindrical seat 11 has two different diameters on its outer surface so as to form a shoulder 21 along its outer surface. Seat 11 is then positioned within body 10 such that shoulder 21 abuts against shoulder projection 22 within body 10.

Figure 7C:
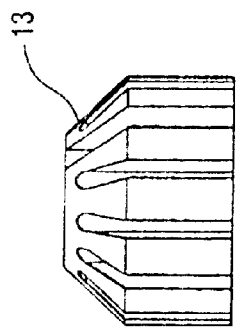
FIGS. 7a–c show different views of one component of the seal fitting of FIG. 5.
Figure 7B:
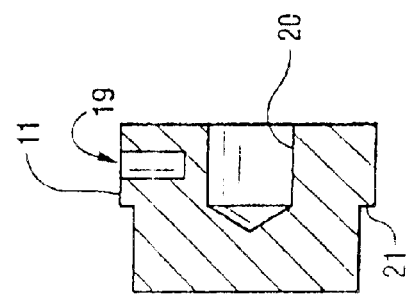
Figure 7A:
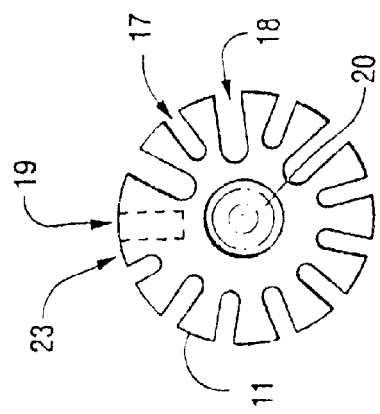

FIG. 7a shows a top view of seat 11 to have a plurality of slots 17 and 18 having varying depths so that particular leads 15 can be arranged so as to pass through the corresponding appropriate slots, as will be described in greater detail below. The depth of slots 17 and 18 disposed within seat 11 are determined by the size of the leads to be disposed within the respective slot. Thus, for example, thermocouple leads can be disposed in slots 18 which have larger depths than slots 17 which are used for other sensor leads having smaller diameters than thermocouple leads.

Depending on the application of the fitting, the slots can be uniform in depth or have varying depths as shown in FIG. 7a. Although FIG. 7a has been shown with slots having two different depths, it may be necessary to provide seat 11 with slots having three or more different depths depending on the types of sensors within the pressure vessel. In the preferred embodiment, seat 11 is provided such that each slot is of sufficient depth to accommodate at least two leads 15 from sensors of a particular type.

FIG. 7b shows seat 11 in cross section to contain opening 20 for receiving cap screw 14, and recess 19 for receiving seat pin 12. The seat pin 12 is inserted through opening 26 in body 10 and into recess 19 formed in seat 11. The seat pin 12 is welded at the outer surface of main body 10 to prevent movement of seat 11 during brazing of the fitting, and to preclude high pressure fluid leakage around the pin from the interior of the pressure vessel. Thus, seat pin 12 fixes the position of seat 11 relative to body 10.

As best shown in FIG. 7c, which shows a side profile of seat 11, stepped portion or shoulder 21 fixes the vertical position of seat 11 within body 10 prior to pin 12 being inserted through body 10 and into recess 19 of seat 11. The stepped portion or shoulder 21 abuts against shoulder projection 22 in the inner sidewall of body 10 (see FIG. 6). Thus, stepped portion or shoulder 21 in seat 11 cooperates with shoulder projection 22 inside of body 10 to limit the vertical placement of seat 11 within body 10. As stated above, the welding of seat pin 12 fixes the position of seat 11 within body 10.

Although the preferred embodiment calls for seat pin 12 to fix the position of seat 11 to main body 10, other fastening devices can also be used. For example, a rivet, capped screw, set screw or the like can also be used.

Insulating material layer 16 is next placed on top of seat 11 and between leads 15 to prevent braze alloy from flowing into the pressure vessel. Any insulating material that can restrain the flow of the brazing material through the fitting and into the interior of the pressure vessel is suitable for this purpose. Commercially available materials known as Fiberfrax, available from Uniform Corporation in Niagara Falls, N.Y., and Stop-off, available from Vitta Corporation in Bethal, Conn., can be used.

Figure 8C:
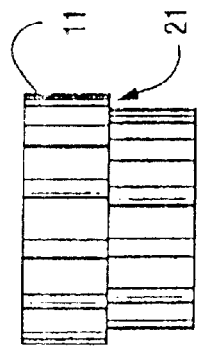
FIGS. 8a–c show different views of another component of the seal fitting of FIG. 5.

The follower 13 is then placed within body 10. As shown in FIGS. 8a and 8c, follower 13 has slots 17' and 18' that respectively align with slots 17 and 18 of seat 11. The slots 17' and 18' allow for leads 15 to traverse from the interior to the exterior of the pressure vessel and vary in depth for the same reasons given above with respect to slots 17 and 18 in seat 11.

The follower 13 can only be placed within body 10 one way so as to align itself with seat 11. A portion 23' of follower 13 that is devoid of slots is keyed to a similar portion 23 on seat 11 that is also devoid of slots. The leads 15 traversing through seat 11 force portion 23' of follower 13 to be aligned with portion 23 of seat 11.

Figure 8B:
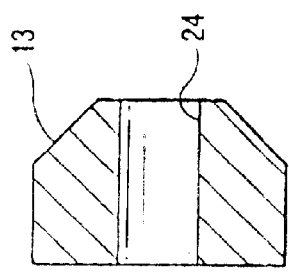
Figure 8A:
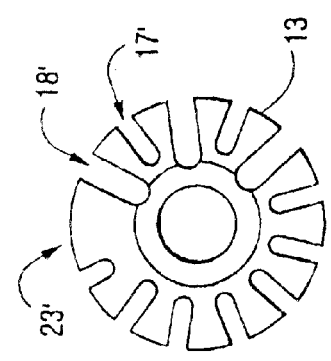

As shown in FIG. 8b, follower 11 has central bore 24. When follower 13 is placed within body 10, bore 24 aligns with opening 20 of seat 11. The bore 24 facilitates provision of cap screw 14 passing through follower 13 and engaging with the opening 20 in seat 11 for securing follower 13 in place. The cap screw 14 can comprise a 10/32" capped head screw or any other suitable fastening means, and is used to preclude movement of follower 13 during the braze cycle. For example, instead of a screw, a screw rivet, set screw or other fastening device could be used.

Braze allow is then applied to the top of follower 13, between leads 15 and around cap screw 14. Any suitable brazing material can be employed depending on the pressure and temperature of the pressure vessel to be sealed. In the preferred embodiment of the present invention braze alloy AMS #4782 E is used.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A seal fitting for use in high pressure equipment having lead wires passing from the interior to the exterior of a pressure vessel through the seal fitting while substantially sealing against leakage of fluid through the seal fitting, said seal fitting comprising:
   a cylindrical main body having a central bore there through with two different diameters so as to form an inner shoulder projection at a point along the central bore, said main body also having an opening through an outer side surface to said central bore;
   a cylindrical seat member having an outer body of two different diameters so as to form an outer shoulder projection at a point along its outer body, wherein when said seat member is placed within said main body the outer shoulder projection of said seat member cooperates with the inner shoulder projection of said main body to restrict displacement of the seat member within said main body; said seat member having a plurality of slots disposed around its circumference, a recess into an outer side surface that can be positioned so as to align with the opening in said main body, and a central recess in a top surface;
   a substantially disk shaped follower member having a central bore there through and having a plurality of slots disposed around its circumference;
   a horizontal fastening means inserted through the opening in said main body into the recess in said seat member for fixing the position of said seat member to said main body; and
   a vertical fastening means inserted through the central bore of said follower member into the central recess of said seat member for fixing said follower member to said seat member.

2. A seal fitting as in claim 1, further comprising insulating material disposed between said seat member and said follower member.

3. A seal fitting as in claim 1, wherein said horizontal fastening means comprises a pin, said pin being welded at the outer side surface of said main body.

4. A seal fitting as in claim 1, said slots in said seat member and said follower member are of sufficient depth to accommodate more than one lead wire per slot.

5. A seal fitting as in claim 1, said slots in said seat member and said follower member have a uniform depth.

6. A seal fitting as in claim 1, said slots in said seat member and said follower member are of one of two different depths.

7. A seal fitting as in claim 1, wherein said vertical fastening means comprises a cap head screw.

8. A method of installing the seal fitting of claim 1, said method comprising:
   welding said main body to an opening in the pressure vessel;
   routing a plurality of lead wires through said main body from the interior to the exterior of the pressure vessel;
   installing said seat member within said main body with the lead wires being arranged in the slots of said seat member and with the recess in said seat member aligning with the opening is said main body;

inserting said horizontal fastening means through said recess in said main body and into said opening in said seat member;

placing insulating material on top of said seat member and around and in between said lead wires;

installing said follower member into said main body so that said slots in said seat member align with corresponding said slots in said follower member and so that said lead wires continue to pass through said slots of said follower member;

positioning said vertical fastening means through said central bore in said follower member into said central bore of said seat member for fastening the seat member to said follower member; and applying braze alloy to a top surface of said follower member, between said leads in said slots of said follower member and around said vertical fastening means to seal any openings through said seal fittings to the interior of the pressure vessel.

9. A method as in claim 8, further comprising welding said horizontal fastening means to the outer surface of said main body.

10. A method as in claim 8, wherein said vertical fastening means comprises a cap head screw and said follower member is fixed to said seat member by passing said cap head screw through the central bore of said follower member into engagement with the central bore of said seat member.

* * * * *